H. CROCHAT.
ELECTRICAL DRIVING.
APPLICATION FILED AUG. 17, 1916.

1,391,529.

Patented Sept. 20, 1921.
3 SHEETS—SHEET 1.

Witnesses

Inventor
Henry Crochat,
by
Attorney.

H. CROCHAT.
ELECTRICAL DRIVING.
APPLICATION FILED AUG. 17, 1916.

1,391,529.

Patented Sept. 20, 1921.
3 SHEETS—SHEET 2.

Inventor
Henry Crochat

By
Attorney

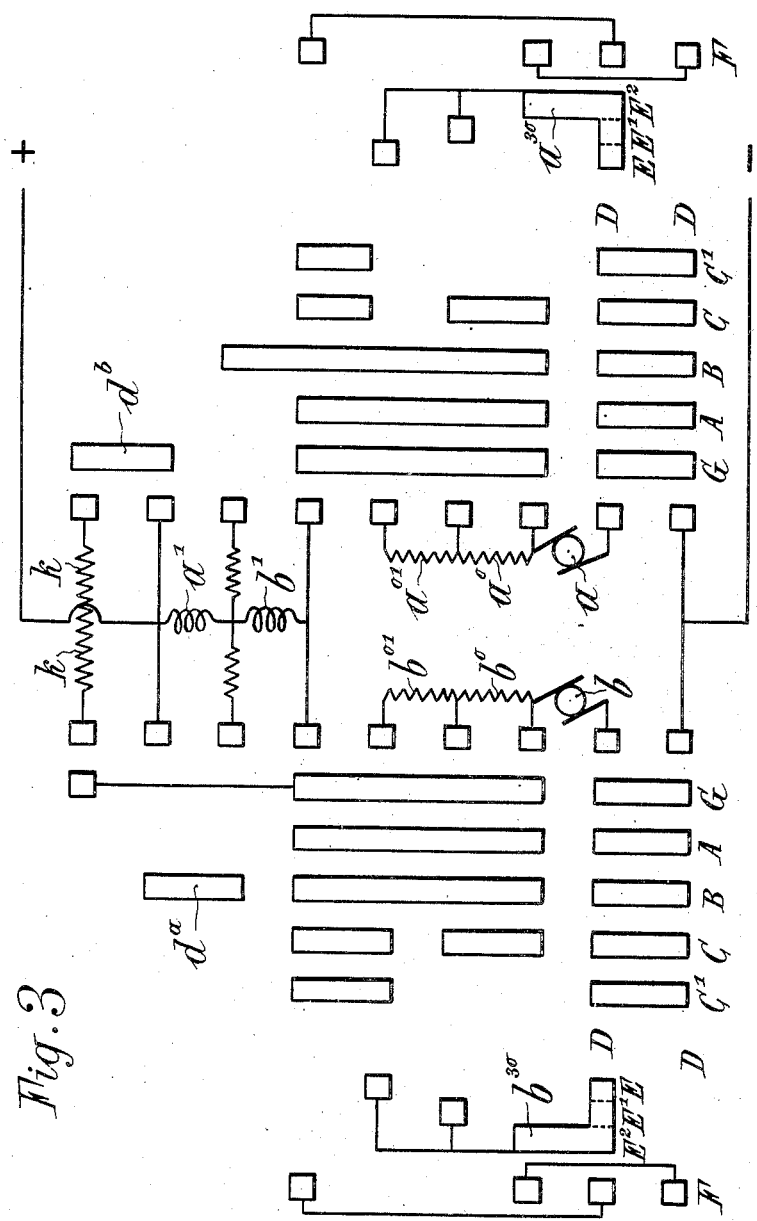

UNITED STATES PATENT OFFICE.

HENRY CROCHAT, OF PARIS, FRANCE.

ELECTRICAL DRIVING.

1,391,529.  Specification of Letters Patent.  Patented Sept. 20, 1921.

Application filed August 17, 1916. Serial No. 115,479.

*To all whom it may concern:*

Be it known that I, HENRY CROCHAT, citizen of the Republic of France, residing at Paris, Department of Seine, France, have invented certain new and useful Improvements in Electrical Driving, of which the following is a specification.

This invention relates to the driving, by means of a single source of electricity, of several shafts which are adapted to turn at different speeds, and more particularly, for the driving wheels of motor vehicles. Such driving is particularly applicable to the driving wheels of motor vehicles in which an endless chain passes over the wheels mounted at one and the same side of the said vehicles and in which therefore the steering can be obtained only by the difference in the speed of rotation of the driving wheels, it being impossible to give the direction to the wheels.

The invention comprises the use of as many motors as there are shafts to be driven, the armature of each motor being keyed to the shaft which it is to drive. The armatures of the said motors are connected in parallel, and their field magnets in series; and there is added to the said motors means for regulating their torque and their speed, *i. e.* their power.

The invention comprises certain other arrangements more explicitly referred to hereinafter and claimed in the claim.

The following means are preferably used, either independently or successively or simultaneously for regulating the power of the each motor:

Means for varying the induction flux of the said motor by completely or partly shunting, or short-circuiting its field windings;

Means for cutting in the circuit of the armature of the said motor a suitable resistance;

And, if—as it happen for the shafts of the two driving wheels of a vehicle—the rotation of one of the shafts has the tendency to produce the rotation of the other shaft, means for transforming the motor into a separately excited electric machine and for short-circuiting the armature of the said electric machine, in order that if the said armature has a tendency to be set in rotation, the electric machine working as a generator, produces a very strong braking action.

In the accompanying drawings:

Fig. 3 shows diagrammatically a controller for the said installation.

Figure 1:
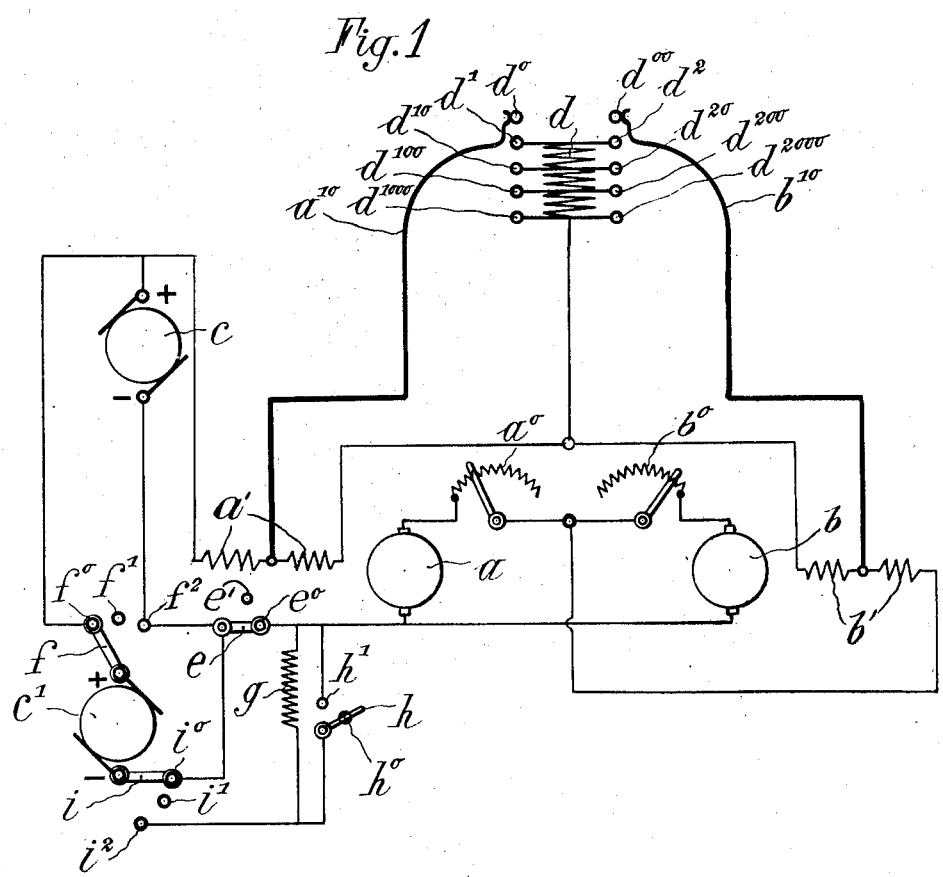
Figure 1 shows diagrammatically an electric installation for the drive of the two driving wheel shafts of a motor vehicle.

The installation shown on Fig. 1 is established as follows:

On the spindle of the left hand driving wheel for the tractor chain 1 is mounted the armature $a$ of a motor, and on the spindle of the right hand wheel for the tractor chain 2 the armature $b$ of a motor of an identical construction.

The connections of the two motors to the generator $c$ which is driven by a prime mover 3, are so arranged that the armatures $a$ and $b$ are connected in parallel, and that the field winding $a^1$ and $b^1$ of the said motors are connected in series.

To the field windings $a^1$ and $b^1$ are then added means suitable for completely or partly shunting, or short-circuiting them whenever desired, and for doing this a single resistance $d$ is used for example. The single resistance $d$ has a double series of contacts, one series $d^1$, $d^{10}$, $d^{100}$, $d^{1000}$ corresponding to the field winding $a^1$, and the other $d^2$, $d^{20}$, $d^{200}$, $d^{2000}$ corresponding to the field winding $b^1$ and one of the ends of the said resistance is connected to the point of the circuit which is common to both field windings $a^1$ and $b^1$. From each of the field windings $a^1$ and $b^1$ is taken at a suitable point a shunt $a^{10}$ and $b^{10}$, and the said shunts are arranged so as to enable them to be connected at will either to a dead contact $d^0$, $d^{00}$, or to one of the contacts of the corresponding series of the resistants $d$.

Into the circuit of each of the armature windings $a$ and $b$ is preferably inserted a rheostat $a^0$, $b^0$.

An installation is thus obtained in which, when the shunts $a^{10}$ and $b^{10}$ are connected to the dead contacts $d^0$, $d^{00}$, and when no portion of the resistance of the rheostats $a^0$, $b^0$ is inserted in the circuit of the armatures $a$ and $b$, an equal current will pass through the field windings $a^1$ and $b^1$, producing equal fields, while the two armatures work with the same voltage, and in producing an equal power; both armatures rotate then at the same speed when they meet an equal resistance. It should be noted that if the resistance opposed to the rotation of one of the armatures becomes stronger than the resistance opposed to the rotation of the other armature, the first armature will have the tendency to rotate at a lower speed, the counter-electromotive force produced in the said circuit being a function of the speed, so that there will be produced in the said armature an increase of intensity, and consequently an increase of torque, having the tendency to cause the said armature to rotate at the same speed as the other.

When it is desired to turn the vehicle to the right or to the left, for instance to the right, it will be sufficient to shunt more or less the field winding of the armature $a$ mounted on the left-hand driving wheel, by connecting the shunt $a^{10}$ to one of the contacts $d^1$, $d^{10}$, $d^{100}$ of the resistance, in this way the flux produced by the field magnet $a^1$ is reduced, and as the armature $a$ is then rotated in a weaker field than the armature $b$, the former will tend to rotate at a greater speed than the latter, but producing however less counter electric force, it will assume a greater intensity, and owing to this greater intensity produce notwithstanding its weaker field a greater torque and a greater power.

In the event of it being necessary to change the direction very suddenly, or in the event of it being desirable to change the direction at starting, the effect obtained by the shunting of that one of the field windings, which corresponds to the side opposite to that to which it is desired to turn, can be increased by introducing a more or less great resistance into the circuit of the armature mounted on the spindle of the driving wheel thus lessening the torque at the side to which it is desired to turn.

In the event of any obstacle opposing the turning, and of the vehicle continuing to travel in a straight line, the two motors would run at the same angular speed, the motor which rotated more quickly, continuing to drive the vehicle. The second armature rotating at the same speed as the first in a stronger field, would then produce a stronger counter-electromotive force, which would quickly become greater than the supply of voltage. Thus, the motor in question would work as a generator and send the current back to the other motor, thus opposing the advance at the corresponding side.

Figure 2:
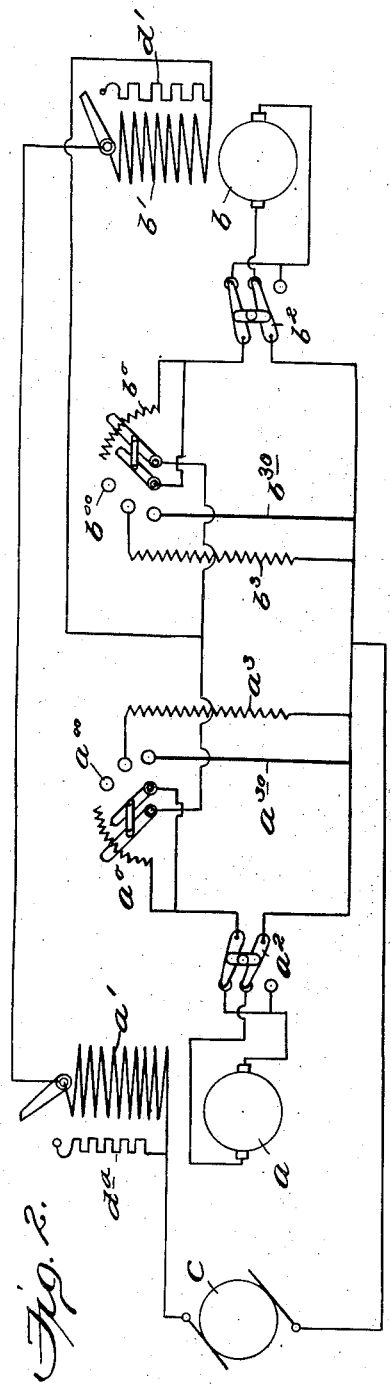
Fig. 2 shows diagrammatically another electric installation for the drive of the two driving shafts of a motor vehicle.
Figure 4:
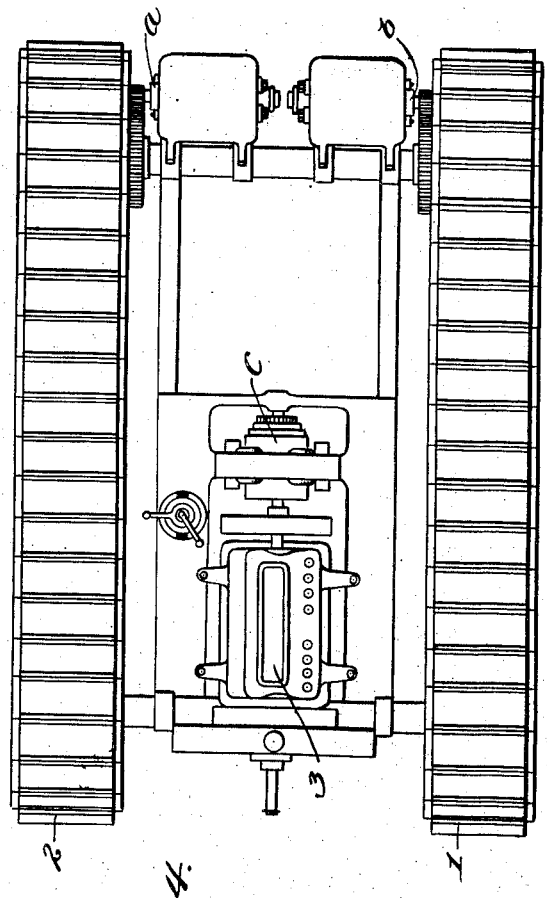
Fig. 4 represents a top plan view of a vehicle having the present invention applied thereto.

In the installation shown on Fig. 2, the armature $a$ of a motor is mounted also on the spindle of the left hand driving wheel and the armature $b$ of another motor of identical construction is mounted on the spindle of the right hand driving wheel, and the connections of the two motors to the generator are so arranged that the armatures $a$ and $b$ are connected in parallel and that the field windings $a^1$ and $b^1$ of the said motors are connected in series.

To the field windings $a^1$ and $b^1$ are added means for varying the induction flux, for instance resistances $d^a$ and $d^b$ allowing the said windings to be shunted.

Into the circuit of each of the armature windings $a$ and $b$ is inserted a rheostat $a^0$, $b^0$, and a reversing switch $a^2$, $b^2$.

Furthermore the rheostats $a^0$ and $b^0$ are provided with a dead contact $a^{00}$, $b^{00}$ allowing the circuit of the armature winding to be cut out in order to transform the corresponding motor into a separately excited electric machine.

Finally the installation is provided with means for allowing a resistance to be shunted between the terminals of the armature winding and for decreasing the value of the said resistance till the armature winding is short-circuited. For that purpose the rheostats $a^0$ and $b^0$ are provided with auxiliary contacts allowing the corresponding armature windings to be successively shunted with resistances $a^3$ or $b^3$, and $a^{30}$ or $b^{30}$ of decreasing values.

An installation is thus obtained in which, when the field windings $a^1$ and $b^1$ are not shunted, and when no portion of the resistance of the rheostats $a^0$, $b^0$ is inserted in the circuit of the armatures $a$ and $b$, an equal current will pass through the field windings $a^1$ and $b^1$, producing equal fields, while the two armatures work with the same voltage and in producing an equal power; both armatures rotate then at the same speed when they meet an equal resistance.

When it is desired to turn the vehicle to the right or to the left, for instance to the right, it will be sufficient to shunt the field winding of the armature $a$, mounted on the left hand driving wheel, by means of the resistance $d^a$, and as the armature $a$ rotates in a weaker field than the armature $b$, it will rotate at greater speed than the latter, and assume a greater intensity, and consequently produce a greater torque and a greater power.

In the event of it being necessary to change the direction very suddenly, or in the event of it being desirable to change the direction at starting, a stronger action can be obtained as follows:

A resistance is introduced into the circuit of the armature mounted on the spindle of the driving wheel at the side to which it is desired to turn; this being obtained for turning the vehicle to the right by acting on the rheostat $b^0$.

The braking action on the right driving wheel is increased by increasing the value of the resistance introduced into the circuit of the armature till the said resistance becomes infinite, i. e. till the lever of the rheostat $b^0$ is brought on the dead contact $b^{00}$.

Then the connections between the armature $b$ and its field winding $b^1$ are cut out and the motor of the right wheel is transformed in a separately excited machine.

And as the vehicle has the tendency to be driven forward in consequence of the rotation of the left driving wheel, the right driving wheel and consequently the armature $b$ mounted on the spindle of the said wheel has the tendency to rotate and the said armature works then as the armature of a generator.

In order to obtain a very strong braking action on the spindle of the respective armature, it is usually sufficient to introduce a resistance $b^3$ in shunt between the terminals of the armature of the respective motor $b$, and in order to further increase the braking action, the value of the said resistance may be further reduced by introducing a weak or negligible resistance $b^{30}$ in shunt with the armature, the winding of this armature being then substantially short-circuited.

Finally, if the braking action thus obtained is not a sufficient one, the current passing in the said armature may be reversed, by means of the reversing switch $b^2$ for insuring the rotation of the said armature $b$ in the opposite direction with respect to the armature $a$.

And in order to modify easily the connections of the motors, a controller, as that one shown in Fig. 3, can be used for each one of the motors.

For instance the controller for the motor $b$ $b^1$ has a contact bar A corresponding to the normal running, the field windings $a^1$ and $b^1$ being not shunted and no resistance being inserted in the circuit of the armature $b$; a contact bar B corresponding to the shunting of the field winding $a^1$, as a part $d^a$ of the said bar shunts the said field winding $a^1$; a contact bar C corresponding to the inserting of a resistance $b^0$ in the circuit of the armature winding $a$, and a contact bar $C^1$ corresponding to the inserting of a greater resistance $b^0+b^{01}$ in the said circuit; a contact bar D corresponding to the cutting out of the said circuit and consequently to the transformation of the motor into a separately excited electric machine; a contact bar E corresponding to the shunting between the terminals of the armature winding $b$ of a resistance ($b^3$) constituted by the resistances $b^0+b^{01}$; a contact bar $E^1$ corresponding to the shunting between the said terminals of a weaker resistance $b^0$; and a contact bar $E^2$ corresponding to the short-circuiting of the armature winding by the part $b^{30}$ of the contact bar; a contact bar F acting as reversing switch for the said armature $b$.

Advantageously the controllers comprise further a contact bar G, allowing if and only if the contacts are insured for the two motors by the bar G of their corresponding controller, the shunting of the field windings of the two motors by means of a resistance $k$ which diminishes the induction flux and, consequently, increases the speed and torque of the motor which thus takes more current than the other.

Preferably the two controllers are so mounted that for each controller the contact bars are disposed approximately on half a circumference. It is so possible to join the two controllers and to control them by means of two levers which can be rotated of half a circumference so that the two levers constitute so to say a hand-wheel.

A shunt or compound dynamo of any well known type may be used for supplying the motors, for the purpose of obtaining the advantages of variation of speed, due to the series-parallel working. This dynamo as shown in Fig. 1 may have two armatures or it may have a single armature and two collectors $c$, $c^1$ in which the connections are arranged so that it is possible to change from series running to parallel running, without cutting off the current from the circuit. This change of coupling or connection is effected as follows, assuming that the two armatures or collectors are originally branched in parallel, the switch $e$ is on the contact $e^0$, the switch $f$ on the contact $f^0$, the switch $h$ on the contact $h^0$ and the switch $i$ on the contact $i^0$.

The change to series working would be effected by first insulating the armature $c^1$ by moving the switch $f$ to the dead contact $f^1$, and the switch $i$ to the dead contact $i^1$, then connecting the positive terminal of the armature $c^1$ to the negative terminal of the armature $c$ by moving the switch $f$ to the contact $f^2$, at the same time $c^1$ is made to work on the resistance $g$ by moving the switch $i$ to the contact $i^2$. At this moment the switch $e$ would be moved to the dead contact $e^1$, and the two armatures work in series through the resistance $g$. Finally, the two armatures are made to work in series without resistance, by moving the switch $h$ to the contact $h^1$, so as to short-circuit the resistance $g$.

But preferably the dynamo having two armature windings and two collectors is made such that with one of the winding working alone, the greatest intensity is obtained. Thus the parallel working and the disadvantages of such a parallel working are avoided as the same effect of supply of the maximum intensity will be obtained by cutting out the armature winding having the least section; the series working of the two armatures being obtained as usually.

Obviously the invention is not limited to the systems described, but comprises any modifications within the scope of the claim.

Having now particularly described and ascertained the nature of my said invention and in what manner the same is to be performed, I declare that what I claim is:

In a system for propelling a vehicle, an electric generator, driving means therefor, a pair of mechanically independent electric motors connected to driven means at the sides of the vehicle, the armatures of said motors being connected in parallel and the field windings of said motors being connected in series with each other and with their armatures, and a controller for the motors comprising means for independently shunting the field windings of the respective motors, means for introducing a resistance in the armature circuit of each motor and for increasing such resistance until the respective armature is cut out of the circuit, means for shunting the brushes of the armature thus cut out of the circuit by a resistance, means for diminishing the amount of such resistance, and means for reversing the current in the armature of the motor thus cut out.

In testimony whereof I have hereunto set my hand in presence of two subscribing witnesses.

HENRY CROCHAT.

Witnesses:
CHAS P. PRESSLY,
FERNAND OUVRARD.